UNITED STATES PATENT OFFICE.

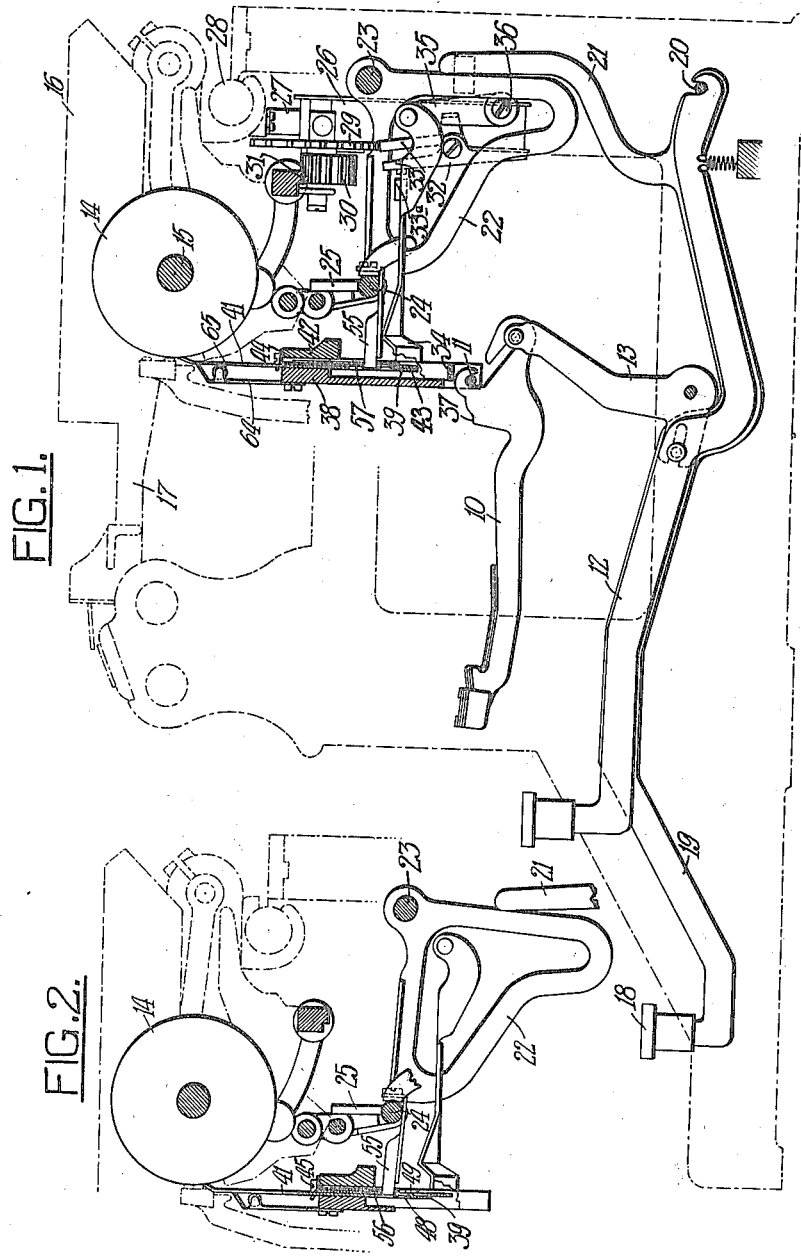

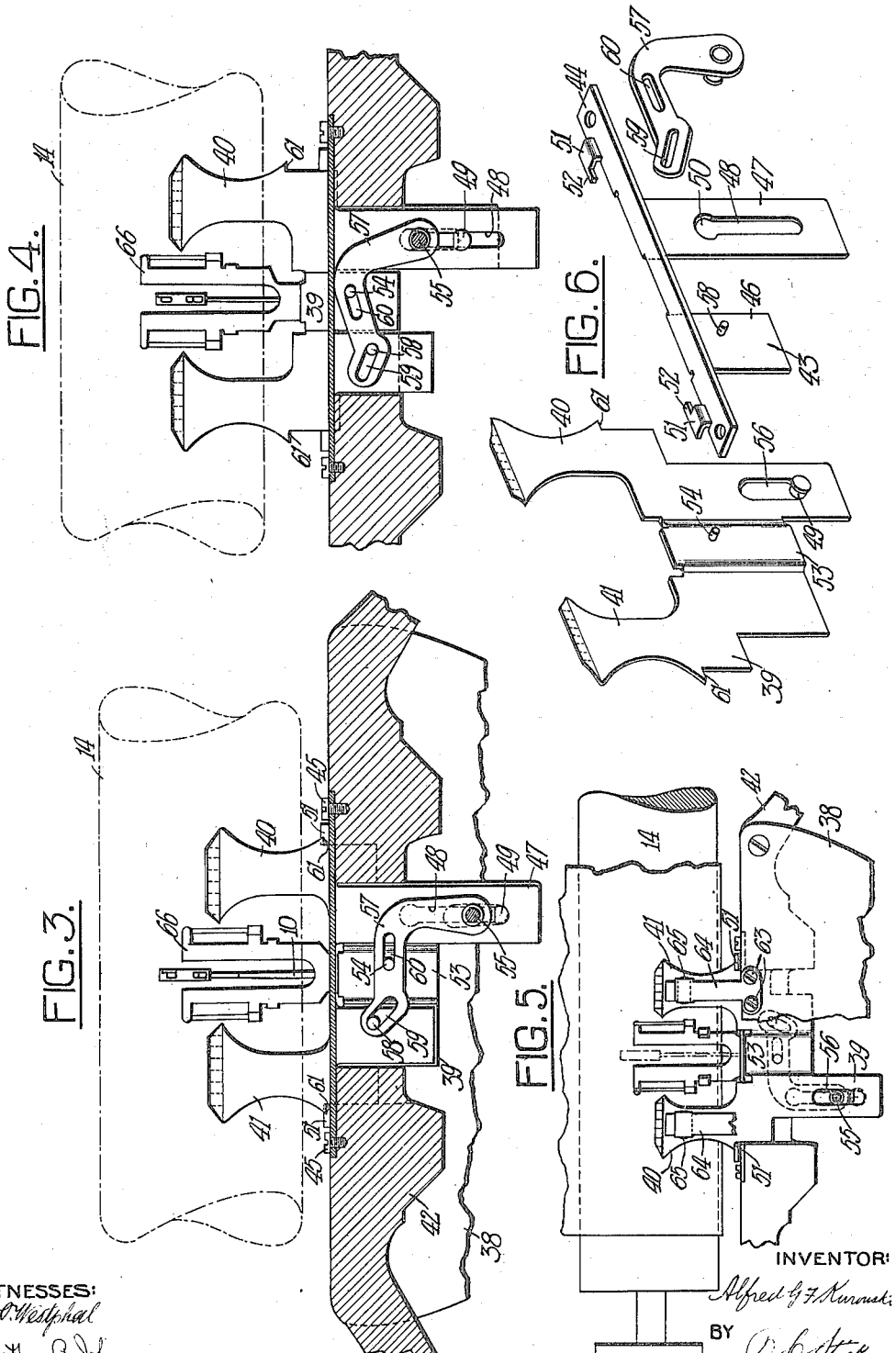

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPE-WRITING MACHINE.

1,220,647.  Specification of Letters Patent.  Patented Mar. 27, 1917.

Application filed October 15, 1915. Serial No. 55,917.

*To all whom it may concern:*

Be it known that I, ALFRED G. F. KUROWSKI, a subject of the German Empire, residing in Brooklyn borough, in the county of Kings, city and State of New York, have invented certain new and useful Improvements in Type-Writing Machines, of which the following is a specification.

The present invention relates to line gages and work-sheet-holders for front-strike typewriting machines in which the platen has a case-shifting movement. Line gages of this character usually present a graduated edge or scale to the platen at the printing line for determining a desired position of the work-piece, both as to line-spacing and as to letter-feed spacing thereof. When used as a work-piece-holder, the device bears upon the platen at or about the printing line to supplement the feed rollers in holding the work-piece snugly to the platen; and, in this connection is particularly useful where the work-piece is a card of relatively stiff material, or is otherwise difficult to hold properly. The device may be used as a holder only, and in such event may lack the scale. In order that the device may perform its functions in all case positions of the platen, it is shiftable with the platen between case positions.

Where the gage and holder bears upon the work-piece on the platen, it is desirable that in the shifting operation, it have the same movement as the platen; that is to say, that the two act together without differential movement of one on the other. Otherwise, the gage and holder would tend to tear or displace the work-piece, particularly where roller platens are used. If the scale and holder be spring-pressed against a work-piece on a roller platen, and if there be differential movement of the platen and holder in the shifting operation, then the gage and holder, in addition to having movement in the direction of the shift of the platen, will also swing, in or out, in following the curve of the platen surface, and at times will lie in such a position that the case-shifting movement of the parts will force it against the surface of the work-piece, rather than tangentially to that surface.

It is a feature of the present invention to provide means for shifting the line gage and work-piece-holder between case positions with the platen, without differential or separate movement of the two. I effect such shift of the gage and holder by connecting the same to the platen-shifting device; and obtain the same shifting movement of the platen and of the gage and holder regardless of the fact that these two elements may be connected to shifting parts which primarily have different movements; and, where such different movements exist, I provide a compensating device intermediate the gage and holder and the platen shifter, for translating, what would otherwise be differential movement of the two, into identical movement thereof.

It is a feature of the invention to provide a gage and holder which normally exerts a resilient pressure sufficient to hold ordinary paper work-pieces, but which automatically exerts an increased resilient pressure on thicker and heavier work-pieces inserted between it and the platen. It is a feature of the invention, resulting from absence of differential movement of the gage and holder on the work-piece in the case-shifting operation, that the spring pressure of the gage and holder on the work-piece may be as heavy as may be required to hold any work-piece to the platen without liability of tearing or displacing a light work-piece.

Another feature is to have the gage and holder mounted on the main frame independently of the platen and platen carriage, and connected to the platen-shifting device independently of the parts which have letter-feed movement; the gage and holder being positively actuated by the same connections whether in moving from lower to upper-case position, or in the opposite direction.

In the preferred form of the invention the gage and holder is a plate, with a graduated edge at the printing line, mounted for up-and-down sliding movement on a guide plate secured to the type segment. This guide plate may also serve as a guide for the ribbon vibrator. As applied to an Underwood typewriting machine, the means for shifting the gage and holder may be a pin which extends forward from the platen shift rail, and which works in a slot in the aforesaid guide plate. To compensate for the differential movement of the shift rail with respect to the end of said pin in the slot at the gage and holder (due to the difference in the distance of the two from the pivot on which, in the Underwood machine, the shifting device swings), there is mounted on the guide plate, in engagement with said pin on the shift rail, a cam on a lever, which is so shaped, and so moves, as to cause motion to be lost between the pin and the gage and holder; whereby the gage and holder is made to have the same shifting movement as the platen.

Other features and advantages will hereinafter appear.

In the accompanying drawings,

Figure 1 is a sectional view in elevation of an Underwood typewriting machine with the present invention applied thereto, the platen and rising scale plates being in normal or lower-case position.

Fig. 2 is a sectional view showing the platen, platen frame, and rising scale plates in upper-case position.

Fig. 3 is a view in rear elevation showing the platen and rising scale plates in normal or lower-case position.

Fig. 4 is a view similar to that of Fig. 3, except that the parts are in upper-case position.

Fig. 5 is a front view of the parts shown in Fig. 3.

Fig. 6 is a perspective view of the rising scale plate, its actuating lever, and its support and guide; the parts being shown as unassembled.

Referring to Fig. 1, type-bars 10, having upper and lower-case types, are mounted on a fulcrum rod 11 and actuated by key levers 12 connected through bell-cranks 13 to the type-bars to cause the latter to swing upwardly and rearwardly against the front face of a roller platen 14. The platen is mounted on a shaft 15, journaled in a platen frame 16, shiftable on the carriage 17 to bring the platen to upper and lower-case positions. The platen frame is shifted by means of shift keys 18, (there being preferably a shift key at each end of the keyboard) on shift key-levers 19, fulcrumed at 20, and having an arm 21 extending upwardly to swing a platen-shifting frame which comprises brackets 22, fixed to a rock shaft 23, and carrying a shift rail 24 on which runs a roller 25 in the platen frame. When a shift key 18 is depressed, the shift rail 24 is moved upwardly and carries the platen vertically to upper-case position. The carriage is driven in letter-feed direction by the usual spring drum 26 connected through a belt 27 to the carriage, the latter running on a rear rail 28 and a front rail, not shown.

The letter-feed travel of the carriage is controlled by escapement mechanism comprising an escapement wheel 29 driven by a pinion 30, running in mesh with a carriage rack 31. The rotation of the escapement wheel 29 is controlled by a dog-rocker 32 carrying dogs 33 working with the wheel. The rocker is normally held in Fig. 1 position by a spring (not shown), but is engaged and thrown back at type strokes by a shoulder 33$^a$ on a universal bar 34. The universal bar is supported at its rear by arms 35 pivoted at 36, on the main frame. Each type-bar has a shoulder 37 which engages the universal bar and moves the same backwardly when the type key is depressed, thus operating the escapement mechanism.

The parts thus far described may be of the usual construction found in Underwood typewriting machines.

Mounted for up-and-down movement on the type-bar segment 38 is a scale plate 39. The scale plate has two wings 40 and 41, one on each side of the printing point. The upper edges of the wings are straight and are alined with each other to indicate the position at which a line of printing will be made by the types on the platen. The wings have the usual scale graduations at letter-space intervals along their upper edges. The segment plate 38 is secured to the front face of a bar 42, and the latter has a countersink within which the scale plate is set. Also within this countersink is a plate 43 on which the scale plate slides. The plate 43 has a horizontal flange 44 overlying the bar 42 and attached thereto by screws 45, so that the plate 43 is fixed. It also has two depending tongues 46 and 47. The tongue 47 has therein a vertical slot 48 to receive a headed pin 49 on the scale plate 39. An enlargement 50 of the upper end of the slot 48 permits the head of the pin 49 to pass through the plate 43 when the scale plate is set against the latter in assembling. On the flange 44 of plate 43 are two ears 51 which project forwardly and have guard pieces 52 adapted to overlie the front face of the scale plate. The ears 51, coöperating with the side edges of the scale plate, and the pin 49 coöperating with the slot 48, serve as guides to hold the scale plate, with its graduated edges horizontal in all case positions to which the scale plate is moved up and down on the plate 43. The head of the pin 49, and the guards 52 hold the scale plate flat against the plate 43. The scale plate is bellied out at 53 between the tongues 46 and 47 of the plate 43, and the part 53 carries a pin 54 by means of which the scale plate is lifted and lowered between case positions. For shifting the scale plate, there is secured to the shift rail 24, a pin 55 which passes through the slot 48 in the plate 43 and also through a slot 56 in the scale plate. Pivotally connected to the pin 55, and lying flat against the tongues 46 and 47 of the plate 43, and against the part 53 of the scale plate is a bell-crank lever 57. The lever 57 is slotted at 59 to receive a fixed guide pin 58 on the tongue 46 of plate 43. It also has a cam formed by a slot 60 cut therein and adapted to receive the pin 54 on the scale plate. When the shift rail is in lower-case, Fig. 1, position, the lever 57 lies, as shown in Fig. 3, with the rail-pin 55 near the bottom of the slot 48, and with the pins 58 and 54 at the left hand ends of the slots 59 and 60, respectively. The cam slot 60 at this time extends horizontally. If a shift key 18 is now operated to rock the shift frame 22, and lift the shift rail 24 with the platen, to upper-case position, the pin 55 moves up in the slot 48 until it and the lever 57 assume the position shown in Fig. 4, in which the pins 58 and 54 are at the right hand ends of the slots 59 and 60. It will be noticed that although the pin 54 and the scale plate have been thrown upwardly, the distance between the base lines of the types on the typebars in moving from Fig. 3 to Fig. 4 position, yet they have not traveled as far as has the rail-pin 55. There has consequently been lost upward motion at the pin 54, due to the slipping of the lever 57 to the left. The amount of this lost motion is designed to be just equal to the amount by which the motion of the forward end of the pin 55 exceeds the motion of the shift rail 24 owing to the difference in the distance of the two from the pivot 23, around which both swing. The lever 57 therefore acts as a compensating device whereby the line gage and work-piece-holder is caused to have the same shift movement at all times as has the platen, despite the fact that the two connect to parts of the shifting mechanism which in reality have a differential movement. The piece 57 may also be considered as a lever fulcrumed on the pin 58 and having the scale plate pivotally connected to it at the point 54. As the lever-actuating pin 55 moves in a straight slot 48, the lever must be slotted at 59 and 60 to have horizontal play. Considering 57 as a lever, then the lost motion may be figured in the light of the relative length of the arms from the fulcrum pin 58 to the pins 54 and 55, respectively.
The slot 56 in the scale plate 39 is of a length sufficient to allow for the differential movement of the pin 55 with respect to the scale plate. The end walls of the slots 59 and 60 may serve as stops to determine the throw of the scale plate to upper and lower-case positions; or the upper-case position may be determined by engagement of the cam with the flange 44 of the plate 43, and the lower-case position by shoulders 61 on the scale plate engaging with the ears 51 on the plate 43. Gravity may assist in the return of the scale plate to lower-case position.

The wings 40 and 41 of the scale plate serve also as paper-fingers to hold the work-piece to the platen at the printing line, and are particularly useful in this connection where the work-piece is a card, or where, because of the stiffness or nature of the work-piece, it tends to belly outwardly from the platen above the feed rollers. The wings are of resilient material, and normally exert a relatively light pressure on the platen, this pressure being sufficient, however, to hold ordinary paper work-pieces in place. Fixed by screws 63 to the fixed segment plate 38 are spring clips 64, each carrying a roller 65 which bears on one of the wings 40 and 41 of the scale plate. The pressure of the clips 64 is effective in all case positions of the gage and holder, although the clips do not move with the gage and holder. The clips have as a first advantage the function of stiffening the resistance of the wings to any tendency to force the same out from the platen, and conversely, to increase the pressure of the wings as they are forced out from the platen. The wings are therefore caused to exert a stronger pressure on a thick work-piece or card than on a lighter one, and this is as it should be, because the heavy work-pieces have the most tendency to spring out from the platen. In the second place it is not always desirable to have the gage plate and holder itself of a shape and setting to bear strongly on the platen. By reason of the clips 64, the gage plate and holder may be made relatively light and flat, so as to be easily movable up and down, and it will nevertheless exert all desired pressure on the work-piece.

The plate 43 may serve as a guide for a ribbon vibrator 66 such for instance, as is found in the Underwood machine and is vibrated at type strokes by the usual mechanism provided therefor in that machine. The vibrator 66 is set between the tongues 46 and 47 in the pocket provided by the offset 53 in the scale plate.

Variations may be resorted to within the scope of the invention, and portions of the improvements may be used without others.

Having thus described my invention, I claim:

1. In a typewriting machine, the combination with a platen shiftable between upper and lower-case positions, of a line gage at the face of the platen to indicate the writing line thereon, a carriage in which the platen is supported for letter-feed movement with respect to the line gage, a device independent of the carriage for shifting the line gage to maintain the same line-indicating position of the gage at the platen in both case positions of the latter, and means for actuating said gage-shifting device when the platen is shifted.

2. In a typewriting machine, the combination with a platen shiftable between upper and lower-case positions, of a work-piece-holder bearing against the platen at the writing line, a carriage in which the platen is supported for letter-feed movement with respect to the said holder, a device independent of the carriage for shifting the holder to maintain a substantially constant relation of the holder to the platen in both case positions of the latter, and means for actuating the holder-shifting device when the platen is shifted.

3. In a typewriting machine, a platen carriage, a platen shiftable between upper and lower-case positions on the carriage, a plate coöperating with the platen at the printing line to enable proper typewriting, a rail along which the platen is driven when the carriage moves, means for shifting the rail to cause the platen to be thrown from one to another case position, and a connection from the rail to said plate whereby the latter is shifted with the platen in either direction to maintain the position of the plate relative to the printing line at the platen.

4. In a typewriting machine, a platen carriage, a frame on which the carriage runs, a platen shiftable between upper and lower-case positions on the carriage, a plate on said frame coöperating with the platen at the printing line to enable proper typewriting, a rail along which the platen is driven when the carriage moves, means for shifting the rail to cause the platen to be thrown from one to another case position, a device on said frame for shifting said plate, and a connection from said rail to the plate-shifter whereby the latter is actuated to shift the plate with the platen to maintain the position of the plate relative to the printing line at the platen in both case positions of the platen.

5. In a typewriting machine, a platen carriage, a platen shiftable between upper and lower-case positions on the carriage, a plate coöperating with the platen at the printing line to aid in the proper positioning of a work-sheet on the platen, a rail along which the platen is driven when the carriage moves, means for shifting the rail to cause the platen to be thrown from one to another case-position, a cam for shifting said plate, and a connection from said rail to the cam for actuating the latter when the platen is shifted, so that the relative position of the plate and the platen is maintained in both case positions of the platen.

6. In a typewriting machine, a platen, means for effecting a shift of the platen between upper and lower case positions, a line gage and work-piece-holder opposed to the platen at the printing line, a connection operated by the platen-shifter for effecting a shift of the line gage and work-piece-holder concurrently with that of the platen, said connection having an effective throw which differs from the throw of the platen between case positions, and a compensating device between said connection and the line gage and work-piece-holder for equalizing the throw of the platen and of the line gage and work-piece-holder so that the relative positions thereof may be maintained in both case positions of the platen.

7. In a typewriting machine, a platen, a line gage and work-piece-holder opposed to the platen at the printing line, a shift frame operating on both the platen and the line gage and work-piece-holder, at different distances from the pivot of said shift frame, for shifting said elements concomitantly between upper and lower-case positions, and a compensating device intermediate the shift frame and the line gage and work-piece-holder for equalizing the throw of the latter and of the platen, to maintain the relative positions of these elements in both case positions of the platen.

8. In a typewriting machine, a platen, a line gage and work-piece-holder opposed to the platen at the printing line, a shift frame operating on both the platen and the line gage and work-piece-holder, at different distances from the pivot of said shift frame, for shifting said elements concomitantly between upper and lower-case positions, and a cam connected to the shift frame and to said line gage and work-piece-holder for equalizing the throw of the latter and of the platen, to maintain the relative positions of these elements in both case positions of the platen.

9. In a typewriting machine, a platen, means for shifting the platen between case positions, a line gage and work-piece-holder opposed to the platen at the printing line, and a cam for shifting the line gage and work-piece-holder with the platen, actuated from said platen-shifting means.

10. In a typewriting machine, a platen, means for shifting the platen between case positions, a line gage and work-piece-holder opposed to the platen at the printing line, and shiftable on the main frame between case positions, a cam connected to the main frame for shifting the line gage and work-piece-holder, and means connected to the platen-shifter for actuating the cam.

11. In a typewriting machine, a platen, means for shifting the platen between case positions, a line gage and work-piece-holder opposed to the platen at the printing line, a lever fulcrumed on the fixed framework and having the line gage and work-piece-holder connected thereto, and a connection from said lever to the platen-shifter for actuating the lever to cause the latter to shift the line gage and work-piece-holder with the platen.

12. In a typewriting machine, a main frame, a platen carriage having letter-feed movement on the main frame, a platen shiftable between case positions on the carriage, means for shifting the platen, a line gage and work-piece-holder on the main frame, and a device for shifting the line gage and work-piece-holder in both directions between case positions, operated from said platen-shifting means.

13. In a typewriting machine, a main frame, a platen carriage having letter-feed movement on the main frame, a platen shiftable between case positions on the carriage, means for shifting the platen, a line gage and work-piece-holder on the main frame, and a pivoted lever on the main frame for shifting the line gage and work-piece-holder between case positions.

14. In a typewriting machine, a main frame, a platen carriage having letter-feed movement on the main frame, a platen shiftable between case positions on the carriage, means for shifting the platen, a line gage and work-piece-holder on the main frame, and a device connected to the platen-shifting means independently of the platen and platen carriage for shifting the line gage and work-piece-holder between case positions.

15. In a typewriting machine, a main frame, a platen carriage having letter-feed movement on the main frame, a platen shiftable between case positions on the carriage, means for shifting the platen, a line gage and work-piece-holder shiftable with the platen between case positions, and means fixedly secured to the main frame for holding said line gage and work-piece-holder to the platen in both case positions of the latter.

16. In a typewriting machine, a main frame, a platen carriage having letter-feed movement on the main frame, a platen shiftable between case positions on the carriage, means for shifting the platen, a guide plate fixed to the main frame, and a line gage and work-piece-holder slidably mounted for movement on said guide plate between case positions.

17. In a typewriting machine, a main frame, a platen carriage having letter-feed movement on the main frame, a platen shiftable between case positions on the carriage, means for shifting the platen, a guide plate fixed to the main frame, a line gage and work-piece-holder slidably mounted for movement on said guide plate between case positions, and a ribbon vibrator actuated at type strokes and guided by said plate in its movements between normal position and printing position.

18. In a typewriting machine, a main frame, a platen carriage having letter-feed movement on the main frame, a platen shiftable between case positions on the carriage, means for shifting the platen, a guide plate fixed to the main frame, a line gage and work-piece-holder slidably mounted for movement on said guide plate between case positions, and means supported by said plate for actuating the line gage and work-piece-holder.

19. In a typewriting machine, a main frame, a platen carriage having letter-feed movement on the main frame, a platen shiftable between case positions on the carriage, means for shifting the platen, a guide plate fixed to the main frame, a line gage and work-piece-holder slidably mounted for movement on said guide plate between case positions, a lever supported by said plate for actuating the line gage and work-piece-holder, and a pin connected to said lever through a slot in said plate, said slot guiding the lever in its movements and defining the path of movement of said pin.

20. In a typewriting machine, a platen carriage, a platen shiftable between case positions on the carriage, a line gage and work-piece-holder opposed to the platen at the printing line, means for supporting the line gage and work-piece-holder independently of the platen and platen carriage, and means for shifting the platen and the gage and holder between case positions while maintaining the gage and holder motionless with respect to the platen.

21. In a typewriting machine, a platen, a line gage and work-piece-holder opposed to the platen and supported independently thereof, means for shifting the platen between case positions, means, having differential movement with respect to said platen-shifting means, for shifting the line gage and work-piece-holder between case positions, and means for eliminating said differential movement to cause the platen and the gage and holder to maintain at their opposed parts, their respective positions in all case positions.

22. In a typewriting machine, a roller platen, a line gage and work-piece-holder opposed to the platen and supported independently thereof, means for holding the line gage and work-piece-holder resiliently to the platen, means for shifting the platen between case positions, means for shifting the line gage and work-piece-holder between case positions, and an active interponent between said last means and the gage and holder for preventing differential movement of the opposed parts of the gage and holder and platen during case-shifting operations.

23. The combination with a platen, of a combined line-gage and work-member-holder coöperating with said platen, said platen and said line-gage and work-holder being shiftable substantially vertically between upper and lower-case positions, a swinging shift frame for adjusting both said platen and said line-gage and holder between upper and lower-case positions, and compensating means between said swinging frame and said line-gage and holder to allow for the change in character of motion, so as to maintain the line-gage and holder in the same relation to the line of printing on the platen in both upper and lower-case positions.

ALFRED G. F. KUROWSKI.

Witnesses:
W. O. WESTPHAL,
JOHN F. RULE.